Dec. 14, 1926.
H. C. SHRELL
1,610,330
APPARATUS FOR TESTING AND LOCATING TROUBLES IN INTERNAL COMBUSTION ENGINES
Filed March 3, 1921     2 Sheets-Sheet 1
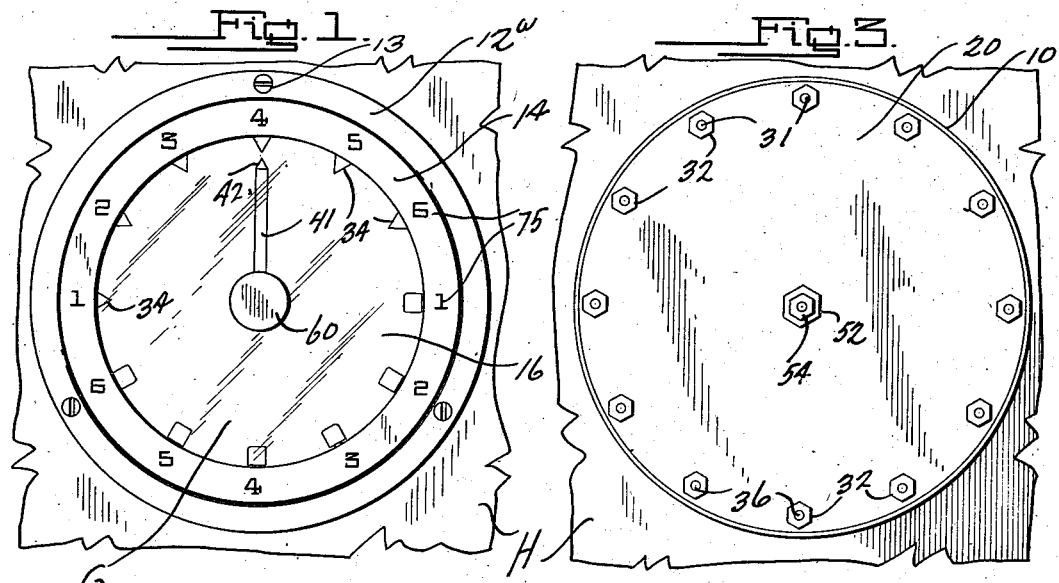
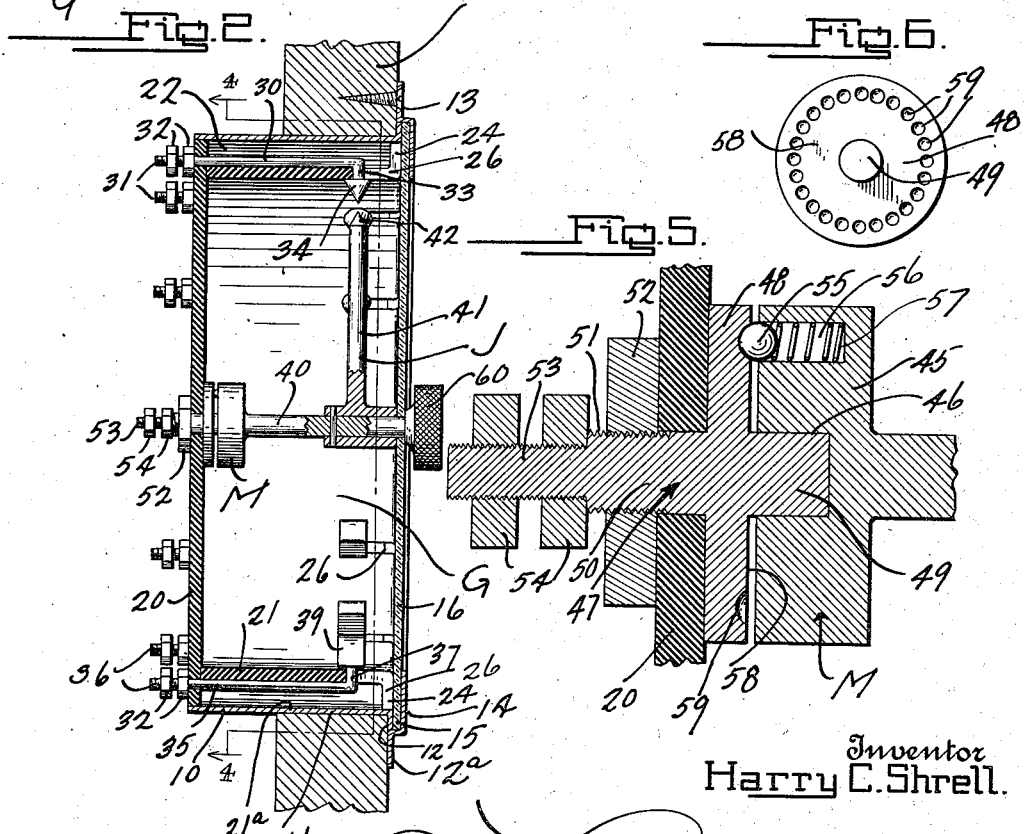
Inventor
Harry C. Shrell.
By Lancaster and Allwine
Attorneys

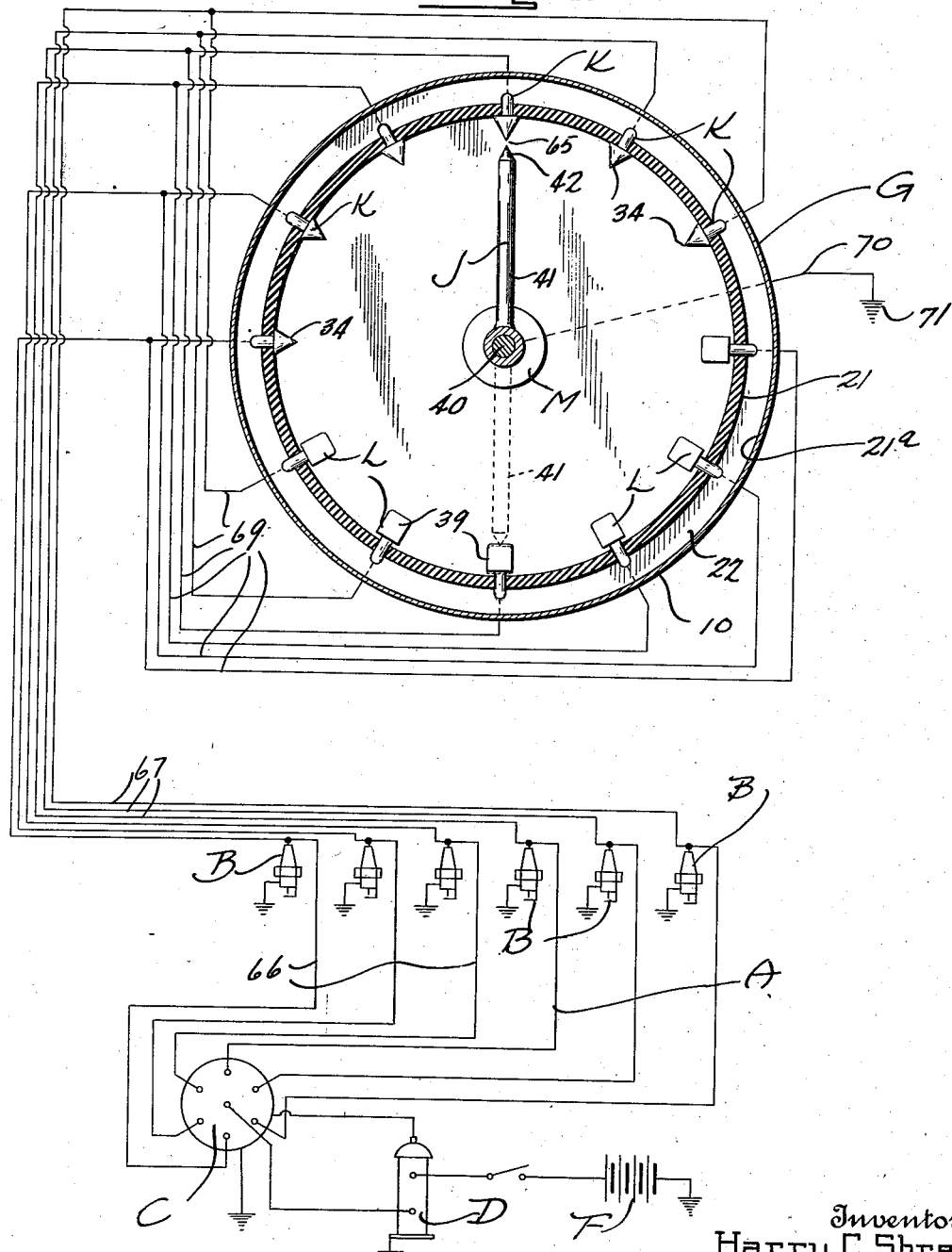

Patented Dec. 14, 1926.

1,610,330

UNITED STATES PATENT OFFICE.

HARRY C. SHRELL, OF DEVOL, OKLAHOMA.

APPARATUS FOR TESTING AND LOCATING TROUBLES IN INTERNAL-COMBUSTION ENGINES.

Application filed March 3, 1921. Serial No. 449,568.

This invention relates to an apparatus for testing and locating troubles in an ignition system of an internal combustion engine.

The primary object of the invention is the provision of apparatus of the above described character, which is primarily adapted for locating ineffective operation of a particular cylinder of an internal combustion engine, and readily determining the cause of such inoperativeness.

A further object of the invention is the provision of apparatus of the above described character adapted for interposition in the ignition system of an internal combustion engine, yet independent of normal operation of said system.

A further object of the invention is the provision of an apparatus of the above described character, which is specifically adapted for use as an accessory to be mounted upon the instrument board of an automotive vehicle for determining lack of operation of any cylinder of an internal combustion engine used to propel said vehicle, and for accurately locating the position of trouble, whether it be due to defective wiring, or an inoperative spark plug.

Other objects of the invention will be apparent during the course of the following detailed description.

In the accompanying drawings, forming a part of this specification, and in which similar reference characters designate corresponding parts throughout the several views, Figure 1 is a plan view of a portion of said improved apparatus, showing the same mounted upon a support.

Figure 2 is a cross sectional view taken through the improved apparatus and showing various details of construction.

Figure 3 is a rear elevation of a part of said apparatus, showing the same in position upon a support.

Figure 4 is a cross sectional view of the apparatus, taken on the line 4—4 of Figure 2, and including therein a diagrammatic representation of said apparatus in circuit with the ignition system of an internal combustion engine.

Figure 5 is a fragmentary cross sectional view taken through several details of the invention.

Figure 6 is a front elevation of an element of the improved apparatus.

In the drawings, wherein for the purpose of illustration is shown the preferred embodiment of my invention, the letter A has reference to the ignition system of an internal combustion engine; and which system includes the spark plugs B; the distributor C; the coil D; and the exciter or current supply F. The ignition system herein set forth can be departed from considerably, since the apparatus is designed primarily for use upon any type of internal combustion engine. The apparatus includes the casing G, detachably mounted upon a support, such as an instrument board H, and which casing includes the indicator arm J; the sparking points K detachably mounted therein, and the contact points L detachably mounted therein. Means M is provided for adjustably maintaining the indicator J in position with respect to the sparking points K and contact points L.

The casing G includes the substantially circular housing 10 adapted for insertion through a suitable aperture 11 provided in the support H, and which is provided with an annular flange 12, adapted to overlie the face of the support H. A retaining ring 12$^a$ is provided having suitable apertures therein for the reception of screws 13 or the like, for detachably connecting said housing 12 to the support H. A forwardly extending flange 14 is also provided and which extends circumferentially about and inwardly of the annular flange 12$^a$ and to provide a suitable recess 15 intermediate the same and flange 12 for the reception of transparent plate 16.

The side of the housing 10 opposite the flange 14 is open and detachably receives an insulating disc 20 of any preferred type of material such as vulcanized fiber or hard rubber. A cylindrical piece of insulation 21 is provided interiorly of the casing G and spaced from the interior 21$^a$ thereof, to provide a circumferential recess 22 within the casing G, the purpose of which will be subsequently set forth. The insulating cylinder 21 is provided with an outwardly extending annular flange 24 integral therewith and which contacts with the inner surface 21$^a$ of the housing 10, and abuts against the transparent plate 16. Suitable recesses and apertures 26 are provided transversely through the cylinder 21 and adjacent the flange 24.

The sparking points K are of peculiar formation, and include the stem 30, the free end 31 of which is screw threaded, to provide a binding post upon which the clamping nuts 32 are mounted, the opposite end of said stem 30 comprising a shank 33 bent substantially at right angles to the longitudinal run of the stem 30, and provided upon the extreme end thereof with a pointed head 34, which in reality comprises the sparking point.

The contact points L are altogether similar in formation to the sparking points K and include the stems 35, provided upon the outer ends with the screw threaded portion 36, adapted to receive binding nuts 32; and provided upon the opposite end with a right angled shank 37. However, instead of being provided with a pointed head 34, said contact points L are provided with a substantially square head 39.

The sparking points K and contact points L are adapted for disposition in the recess 22 provided intermediate the interior 21ª of the casing and the inside of the cylinder 21. To this end, the stems 30 lie directly upon the exterior of the cylinder 21, and have the screw threaded portions 31 and 36 of the sparking points K and contact points L respectively, projecting from suitable apertures in the insulating disc 20, and exteriorly of the casing G. The shanks 33 and 37 of said sparking points and contact points respectively, project inwardly into the cylinder 21, through the slots or apertures 26, so that the pointed heads 34 and square heads 39 lie in circumferential relation within the interior of the cylinder 21. The sparking points K and contact points L, are maintained in such position by means of the inside nut 32 rotated upon the stems 31 and 36 respectively into contact with the disc 20, thus forcing the shank portions of the sparking and contact points into engagement with the cylinder 21. Since the contact points and sparking points have a distinct relation to the various cylinders of the internal combustion engine to which the apparatus is applied, and which relation will be subsequently set forth, it is preferred that there be the same number of sparking points K as contact points L; and that the total number of points be equal to twice the number of cylinders in the engine to which the apparatus is applied. It is preferred that the sparking points K be arranged circumferentially upon one side of the cylinder 21, and that the contact points L be disposed upon the opposite side of said cylinder 21.

The indicator arm J is rotatably mounted in the casing 10 and comprises the shaft 40, and the arm 41, having a point 42 upon the free end thereof. The arm 41 is held in fixed relation upon the shaft 40 as an axis, and extends substantially parallel with the transparent plate 16, and in the same plane as defined by the various sparking points K and contact points L. The means M which is cooperative with the shaft 40, and provided to support the same and maintain the arm 41 in any position, includes the enlarged substantially circular disc 45 formed integral upon an end of the shaft 40, and which is provided with an inward spindle seat 46. The bearing shaft 47 in alignment with the shaft 40 is positioned through a suitable aperture in the disc 20, and includes a disc 48, of substantially the same diametral dimension as the disc 45; a spindle 49 integral upon said disc 48, and adapted to act as a bearing for the support of shaft 40. A shank 50 is also provided for reception within an aperture of the disc 20 and is screw threaded at 51 to receive a binding nut 52 adapted for rotation upon the shank 50 to bind said disc 48 against the inner side of the disc 20. A reduced shank 53 is provided extending outwardly from the casing G and integral upon the shaft 50, and which receives the wire clamping nuts 54. Thus it can be seen that the bearing 47 is maintained in fixed relation upon the disc 20, and the shank or spindle 49 thereon inserted in the spindle seat 46 of the shaft 40, provides a bearing upon which the shaft 40 rotates.

In order that the indicator arm J may maintain a fixed relation with respect to any of the points K or L, a ball 55 is provided, for reciprocation within a recess 56 in the disc 45, and which recess 56 is eccentrically disposed with respect to the axis of said shaft 40, a spring 57 is provided for immediate disposition in the depression 56, and the ball 55 placed thereupon, and which ball 55 is normally urged outwardly into engagement with the face 58 of the disc 48. A plurality of depressions 59 are provided in this face 58 and circumferentially thereupon, to receive the ball 55 as it is urged outwardly by the spring 57. The bearing 47 is so disposed in the disc 20 that the various seats 59 are accurately arranged with respect to the points K and L. The number of the seats 59 is exactly double the total number of sparking points K and contact points L, and which number are provided in order that the indicating arm J may assume an operative position with respect to each point K and L; and having a position intermediate adjacent points, which the arm J can assume in order to be held in neutral spaced relation to said adjacent points.

A thumb or finger engaging nut 60 is provided for disposition upon the end of the shaft 40 and which projects from the transparent plate 16 thus disposing the nut exteriorly of the casing G. As the shaft 40 is rotated by means of the thumb nut 60, the ball 55 will ride over the face 58 of the disc 48 and be disposed in successive positions within the depressions 59. Thus the indicating arm J can assume any position to indicate directly any sparking point K or contact point L, and may likewise assume a positive neutral position intermediate any two adjacent points.

The relation of the sparking points K and the contact points L, with respect to the point 42 of the indicator arm J is of prime importance. The extreme point 42 of the arm 41 should be accurately adjusted with respect to the axis of shaft 40, that upon rotation thereof the same will be spaced with respect to the extreme points of the heads 34 of the sparking points K, in order to provide a gap 65 intermediate any of the sparking points 34 and point 42 when said indicator arm J assumes an operative position with respect to said points 34. On the other hand, when said arm J assumes a definite position with respect to the head 39 of a contact point L, said extreme point 42 of the arm 41 should contact very slightly with the face of said head.

The ignition system A, is as heretofore mentioned, the ordinary ignition system of an internal combustion engine, and is of no consequence, except in so far as said apparatus is used in determining defective wiring. The various wires 66, convey the current from the distributor C to particular spark plugs B, and which is the case in the ordinary ignition system. However, in order to provide an apparatus to locate the spark plug and engine troubles, the various wires 67 are provided, each one of which is connected to an individual spark plug B of the internal combustion engine, and is connected at its opposite end intermediate the binding nuts 32 of a sparking member K to place said sparking member K in circuit with a spark plug. Thus assuming that spark plug No. 1 upon the internal combustion engine has the lead wire 67 conveying the current therefrom directly to the sparking point K upon the extreme left of the casing G, the next adjacent spark plug of said internal combustion engine will have its lead wire conveyed to the next adjacent sparking plug K in the casing or housing G, and which consecutive order of wiring is arranged throughout. Thus an operator knows the relation of the sparking points K with respect to the spark plugs of the engine. There can of course be suitable indicia 75 upon the flange 14 or carried by the casing G to facilitate determination of such circuit arrangement.

In similar manner, the wires 69 are spliced upon the wires 67, and which wires are connected to the terminals 36 and held thereon by the binding nuts 32, in order to place the contact points L in circuit with the wires 67, and more particularly the spark plugs B. The wiring arrangement as followed by a wire 69 is such that a contact point L is in circuit with one of the sparking points K, and which contact point L is in all cases as shown upon Figure 4 of the drawings, diametrically opposed to said sparking point with which it is in circuit. While this arrangement need not necessarily be adhered to, it is nevertheless convenient, and is the preferred arrangement. It can thus be seen that the spark plug B is provided in the casing G with a representative sparking point K, and a contact point L diametrically opposed to said sparking point.

A circuit wire 70 is provided for contact with the terminal or screw threaded end 53 of the bearing 47 and adapted for binding intermediate the nuts 54, and which wire 70 is grounded at 71 in the circuit of the ignition system and conveys said circuit into the shaft 40, and finally into the indicating arm 41.

In operation, in order to determine or locate the source of trouble in an engine, and for testing purposes, the driver or operator of the internal combustion engine rotates the indicator J by means of the thumb nut 60 until the pointer 42 thereof assumes a definite relation to consecutive heads of the contact points L, and upon rotation of said indicator J, to contact with one of the heads 39, said contacting will have the effect of short circuiting the system in the spark plug B, with which said particular contact point L is in circuit and preventing the same from sparking in the cylinder of the engine in which the same is positioned. In such case, the fuel charge in the cylinders will not explode. The operator of the device continues this rotation of the indicator J with successive contact heads 39, and if the operator is informed by the sequence of explosions of said internal combustion engine that such cylinder is cut out from proper explosion of fuel therein, he knows that the defect or trouble is not in that particular cylinder circuit. However, should the indicator J contact with any contact head 39 and no resulting variation in explosions of said internal combustion engine result, he is at once informed in which particular cylinder circuit the defect occurs.

Upon location of the particular cylinder which is not exploding properly, the operator oscillates the indicator J to the diametrically opposed sparking point K; this sparking point K being in circuit with the spark plug B disposed in the cylinder which is not exploding properly. Upon properly positioning said indicator J so that the arm 41 thereof points to the head 34 of the sparking point K to provide a spark gap 65, the operator can determine at a glance whether the defect is in the wiring system in circuit with said cylinder or whether the defect occurs in inoperativeness of the spark plug B in said cylinder. Should a spark jump from the point 34 to the point 42 the operator is at once informed that the defect may exist in the spark plug and not in the wiring of the same. This is the ordinary cycle of operation in order to test the engine. However, the driver of a car can test the spark plugs independent of said cycle of operation, it being merely necessary to oscillate the indicator J to assume operative position with respect to the various sparking points K.

Should the sparking points K or contact points L become disarranged, they can be properly adjusted, with respect to the point 42 of the indicator arm 41 by bending the relatively long stem of said point.

Since the indicator arm 41 can assume a position intermediate any adjacent points, it can readily be seen that this position will be neutral with respect to the ignition system, and consequently will in no way interfere with the ignition system ordinarily used for operation of the internal combustion engine. Thus the entire testing apparatus while in circuit with the ignition system A is entirely independent of the normal operation of said engine.

Various changes in the shape, size and arrangement of parts may be made to the form of invention herewith shown and described, without departing from the spirit of the invention, or the scope of the claims.

I claim:

1. In a device of the character described, a housing, an indicator arm movable within the housing, a plurality of points disposed in unimpeded spaced relation with said indicator arm as the same is moved into co-operative relation thereto, and a plurality of points for contact with the indicator arm as the same is moved into cooperative relation thereto.

2. In an apparatus for testing engines, the combination of a substantially circular housing, an indicating arm rotatably mounted centrally thereof, a plurality of points circumferentially arranged upon said housing for spaced sparking relation with respect to said indicating arm upon movement thereof, and a plurality of points circumferentially arranged upon said housing and adapted for selective contact by said indicator arm.

3. In an apparatus for testing engines, the combination of a substantially circular housing, an indicating arm rotatably mounted centrally thereof, a plurality of points circumferentially arranged upon said housing and free of contact by said indicating arm upon movement thereof, a plurality of points circumferentially arranged upon said housing, and adapted for selective contact by said indicator arm, and means for selectively holding said indicator arm in operating relation with respect to any of said spaced or contact points.

4. In apparatus for testing and locating troubles in an internal combustion engine the combination of a housing, an indicator arm movable within the housing adapted to be connected in an ignition circuit, a plurality of sparking points disposed in the housing adapted to be connected to the respective spark plugs of an ignition circuit and with which the indicator arm moves into spaced sparking relation as the indicator arm is moved within the housing into co-operative relation with said points, a plurality of points carried by the housing for contact by the indicator arm as the latter is moved into cooperating relation therewith, the last mentioned points being adapted to be connected in an ignition circuit with the various spark plugs thereof, and means carried by the housing bearing indicia for each of the above mentioned points respectively referring them to the various spark plugs of an ignition circuit in which the apparatus may be connected.

HARRY C. SHRELL.